United States Patent
Kwon et al.

(10) Patent No.: US 9,531,953 B2
(45) Date of Patent: Dec. 27, 2016

(54) CAMERA MODULE AND PORTABLE ELECTRONIC DEVICE INCLUDING THE SAME

(71) Applicant: SAMSUNG ELECTRO-MECHANICS CO., LTD., Suwon-Si (KR)

(72) Inventors: Oh Byoung Kwon, Suwon-Si (KR); Chul Jin Kim, Suwon-Si (KR); Jae Hyuk Lee, Suwon-Si (KR); Ki Mun Paik, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/495,888

(22) Filed: Sep. 25, 2014

(65) Prior Publication Data

US 2015/0103195 A1 Apr. 16, 2015

(30) Foreign Application Priority Data

Oct. 11, 2013 (KR) .................. 10-2013-0121548
Jan. 29, 2014 (KR) .................. 10-2014-0011270
Jul. 8, 2014 (KR) .................. 10-2014-0085051

(51) Int. Cl.
*H04N 5/232* (2006.01)
*H04N 5/225* (2006.01)
(Continued)

(52) U.S. Cl.
CPC ............ *H04N 5/2328* (2013.01); *G02B 7/102* (2013.01); *G03B 3/10* (2013.01); *G03B 13/36* (2013.01);
(Continued)

(58) Field of Classification Search
None
See application file for complete search history.

(56) References Cited

U.S. PATENT DOCUMENTS 5,926,656 A * 7/1999 Imura ................... G03B 5/00
396/55
8,531,534 B2 9/2013 Hu et al.
(Continued)

FOREIGN PATENT DOCUMENTS

CN 102062926 A 5/2011
CN 102466942 A 5/2012
(Continued)

OTHER PUBLICATIONS

Extended European Search Report dated Feb. 20, 2015 for European Patent Application No. 14275209.6.
(Continued)

*Primary Examiner* — Roberto Velez
*Assistant Examiner* — Quan Pham
(74) *Attorney, Agent, or Firm* — NSIP Law

(57) ABSTRACT

A camera module may include a fixed part, and a driving part moved relatively with respect to the fixed part in a direction perpendicular to an optical axis direction. The driving part and the fixed part may be disposed to be spaced apart from each other in the optical axis direction, and the driving part may be supported by a plurality of suspension wires and a plurality of ball bearings, such that occurrence of tilting of a lens may be prevented when the driving part is driven in the direction perpendicular to the optical axis direction.

34 Claims, 18 Drawing Sheets

(51) Int. Cl.
*G03B 13/36* (2006.01)
*G02B 3/10* (2006.01)
*G02B 7/10* (2006.01)
*G02B 27/64* (2006.01)
*G02B 13/00* (2006.01)
*H04M 1/02* (2006.01)
*G03B 3/10* (2006.01)

(52) U.S. Cl.
CPC .......... *H04N 5/2253* (2013.01); *H04N 5/2254* (2013.01); *H04N 5/2257* (2013.01); *H04N 5/23212* (2013.01); *H04N 5/23287* (2013.01); *G02B 13/001* (2013.01); *G02B 27/646* (2013.01); *G03B 2205/0007* (2013.01); *G03B 2205/0053* (2013.01); *H04M 1/0264* (2013.01)

(56) References Cited

U.S. PATENT DOCUMENTS

| | | | |
|---|---|---|---|
| 8,861,946 | B2 | 10/2014 | Kim et al. |
| 9,046,737 | B2* | 6/2015 | Seol ................ G03B 3/10 |
| 2009/0060485 | A1 | 3/2009 | Takahashi |
| 2009/0097834 | A1* | 4/2009 | Jang .............. G03B 17/00 396/55 |
| 2011/0176046 | A1 | 7/2011 | Hu et al. |
| 2011/0236008 | A1* | 9/2011 | Kang .............. G03B 3/10 396/133 |
| 2012/0106936 | A1 | 5/2012 | Lim et al. |
| 2012/0182436 | A1 | 7/2012 | Hu et al. |
| 2012/0229901 | A1* | 9/2012 | Moriya .............. G03B 3/10 359/557 |
| 2012/0250155 | A1 | 10/2012 | Kiyamura |
| 2012/0320467 | A1 | 12/2012 | Baik et al. |
| 2013/0050828 | A1* | 2/2013 | Sato ............... G02B 27/64 359/557 |
| 2013/0088609 | A1* | 4/2013 | Shimizu ........... H04N 5/2253 348/208.7 |
| 2013/0162851 | A1* | 6/2013 | Shikama ............ G03B 5/00 348/208.99 |
| 2013/0201559 | A1 | 8/2013 | Minamisawa et al. |
| 2014/0009631 | A1* | 1/2014 | Topliss ........... G02B 27/646 348/208.11 |
| 2014/0362284 | A1* | 12/2014 | Shin .............. H04N 5/2254 348/373 |

FOREIGN PATENT DOCUMENTS

| | | |
|---|---|---|
| CN | 102736357 A | 10/2012 |
| CN | 103186010 A | 7/2013 |
| EP | 1 727 358 A2 | 11/2006 |
| EP | 2 840 770 A2 | 2/2015 |
| EP | 2 852 148 A2 | 3/2015 |
| JP | 2011-107470 A | 6/2011 |
| JP | 5007373 B | 6/2012 |
| JP | 2013-44924 A | 3/2013 |
| KR | 10-2011-0086935 A | 8/2011 |
| KR | 10-2011-0106664 A | 9/2011 |
| KR | 10-2013-0044438 A | 5/2013 |
| TW | 201129822 A1 | 9/2011 |

OTHER PUBLICATIONS

US Final Office Action dated Jun. 24, 2015 issued in the related application, U.S. Appl. No. 14/311,210, 7 pages in English.
Taiwanese Office Action issued on Oct. 22, 2015 in counterpart Taiwanese Application No. 103134324 (9 pages in Taiwanese with partial English translation).
Extended European Search Report issued on Dec. 9, 2015 in counterpart European Application No. 15163338.5 (8 pages in English).
Korean Office Action issued on Oct. 27, 2015 in counterpart Korean Application No. 10-2014-00850501 (19 pages with English translation).
Chinese Office Action issue on Oct. 17, 2016 in counterpart Chinese Application No. 201410534441.X. (28 pages in Chinese with English translation).

* cited by examiner

CAMERA MODULE AND PORTABLE ELECTRONIC DEVICE INCLUDING THE SAME

CROSS-REFERENCE TO RELATED APPLICATIONS

This application claims the benefit of Korean Patent Application Nos. 10-2013-0121548 filed on Oct. 11, 2013, 10-2014-0011270 filed on Jan. 29, 2014, and 10-2014-0085051, filed on Jul. 8, 2014 with the Korean Intellectual Property Office, the disclosures of which are incorporated in their entireties herein by reference.

BACKGROUND

The present disclosure generally relates to a camera module and a portable electronic device including the same.

Recently, multi-functional subminiature camera modules have been used in mobile communications terminals such as tablet personal computers (PC), laptop computers, and the like, as well as in cellular phones such as smartphones.

As mobile communications terminals have been miniaturized, the impact of hand-shake on image quality is relatively great at the time of capturing an image using a camera module included in a mobile communications terminal, such that image quality may be deteriorated. Therefore, technology for correcting hand-shake is required in order to obtain a clear image.

When hand-shake occurs at the time of capturing an image, a lens driving apparatus, to which optic image stabilization (OIS) technology is applied, may be used in order to correct the hand-shake.

The lens driving apparatus to which such OIS technology is applied may move a lens module in a direction perpendicular to an optical axis direction. To this end, a suspension wire supporting the lens module may be used.

However, the suspension wire may be deformed during OIS driving. Therefore, driving displacement may occur.

SUMMARY

An exemplary embodiment in the present disclosure may provide a camera module capable of suppressing the occurrence of tilting of a lens at the time of correcting hand-shake, and a portable electronic device including the same.

An exemplary embodiment in the present disclosure may also provide a camera module capable of preventing a suspension wire from being deformed or fractured due to an influence thereon such as an external impact, or the like, and a portable electronic device including the same.

According to an exemplary embodiment in the present disclosure, a camera module may include a fixed part and a driving part moved relatively with respect to the fixed part in a direction perpendicular to an optical axis direction. The driving part and the fixed part may be disposed to be spaced apart from each other in the optical axis direction, and the driving part may be supported by a plurality of suspension wires and a plurality of ball bearings, such that the occurrence of tilting of a lens accommodated in the driving part may be prevented when the driving part is driven in the direction perpendicular to the optical axis direction.

In the camera module, a gap between the driving part and the fixed part in the optical axis direction may be maintained by the plurality of suspension wires and the plurality of ball bearings disposed between the driving part and the fixed part, such that deformation or fracturing of the plurality of suspension wires may be prevented.

In the camera module, when the driving part is driven in the direction perpendicular to the optical axis direction, an elastic member attached to the driving part may be elastically deformed in the optical axis direction to allow the driving part to be moved in a relatively stable manner, with respect to the fixed part.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
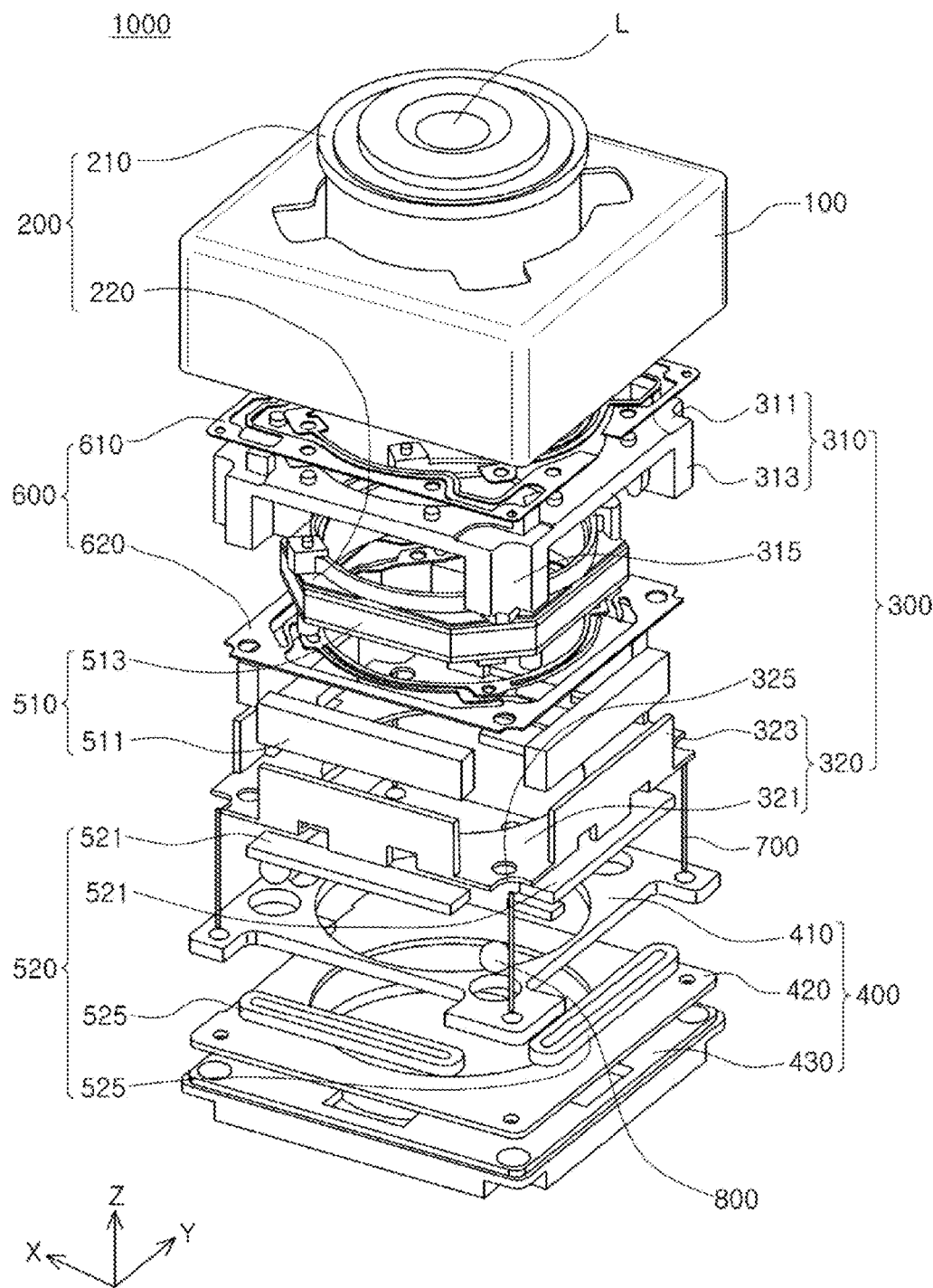
FIG. 1 is an exploded perspective view of a camera module according to an exemplary embodiment in the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Hereinafter, terms with respect to directions will be defined for illustration purposes only. An optical axis direction (that is, a Z-direction) refers to a vertical direction based on a lens barrel 210, and horizontal directions (that is, X-direction and Y-direction) refer to directions perpendicular to the optical axis direction (Z-direction).

Figure 2:
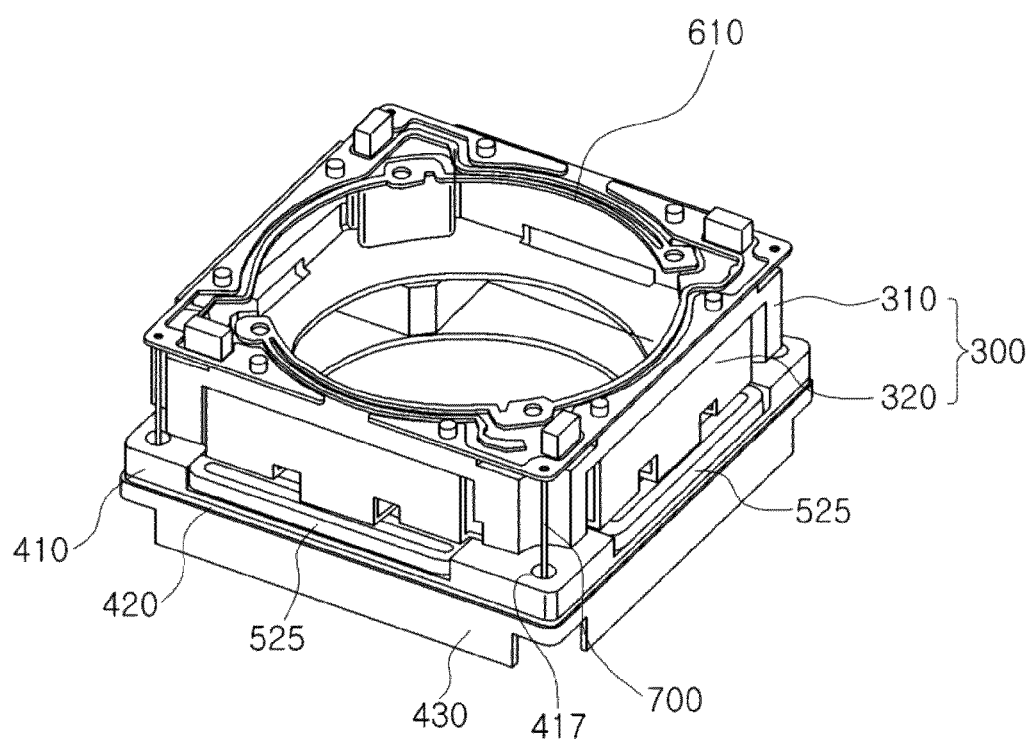
FIG. 2 is a partially assembled perspective view of the camera module according to an exemplary embodiment in the present disclosure.
Figure 3:
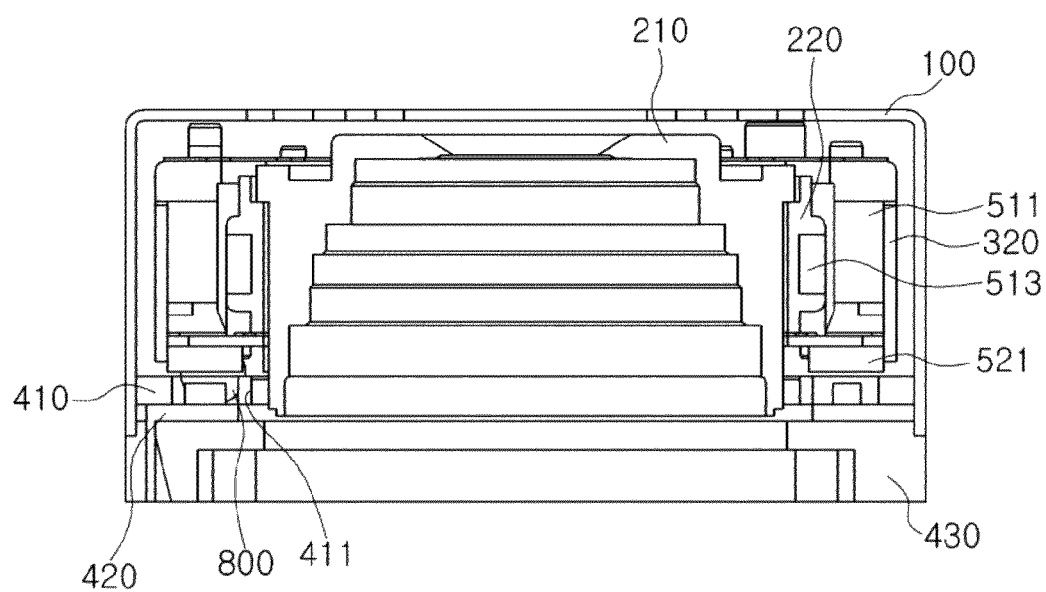
FIG. 3 is a cross-sectional view of the camera module according to an exemplary embodiment in the present disclosure.

FIG. 1 is an exploded perspective view of a camera module according to an exemplary embodiment of the present disclosure. FIG. 2 is a partially assembled perspective view of the camera module according to an exemplary embodiment of the present disclosure. FIG. 3 is a cross-sectional view of the camera module according to an exemplary embodiment of the present disclosure.

Referring to FIGS. 1 through 3, a camera module 1000 according to an exemplary embodiment of the present disclosure may include a lens module 200 including a lens barrel 210 and a bobbin 220, a driving part 300 accommodating the lens module 200 therein, a fixed part 400 disposed to be spaced apart from the driving part 300 in the optical axis direction, one or a plurality of suspension wires 700 connecting the driving part 300 and the fixed part 400 to each other, an auto-focusing driving part 510 providing driving force to the lens module 200, and a hand-shake correcting part 520 providing driving force to the driving part 300.

The lens barrel 210 may have a hollow cylindrical shape to allow one or a plurality of lenses L for imaging a subject to be accommodated therein, and the plurality of lenses L may be provided in the lens barrel 210 along an optical axis.

A required number of lenses L may be stacked depending on a design of the lens module 200, and the plurality of respective lenses L may have various optical characteristics such as the same refractive index or different refractive indices.

The lens barrel 210 may be coupled to the bobbin 220. For example, the lens barrel 210 may be accommodated in the bobbin 220 to configure the lens module 200.

The lens module 200 may be accommodated in, or coupled to, the driving part 300 and be driven in the optical axis direction (Z-direction) for auto-focusing within the driving part 300, and the driving part 300 accommodating the lens module 200 therein may be driven in the horizontal directions (X-direction and Y-direction) in order to correct hand-shake.

Here, the driving part 300 may be disposed above the fixed part 400 and be movable relatively with respect to the fixed part 400 (for example, moved in the horizontal directions (X-direction and Y-direction)) in a state in which the driving part 300 is spaced apart from the fixed part 400 in the optical axis direction.

Here, a configuration of the driving part 300 will be described. The driving part 300 may include a driving frame 310 forming an exterior of the driving part 300 and a yoke plate 320 coupled to the driving frame 310.

The driving frame 310 may have one or more open side surfaces such that side surfaces of the bobbin 220 may be exposed to the outside of the driving frame 310.

For example, the driving frame 310 may include a support plate 311 including a hollow part and having a quadrangular shape and pillar members 313 extended downwardly from respective corners of the support plate 311 in the optical axis direction (Z-direction).

An elastic member 600 may be attached to the driving frame 310 to elastically support the lens module 200.

The elastic member 600 may include a first elastic member 610 and a second elastic member 620.

For example, the first elastic member 610 may be coupled to an upper portion of the driving frame 310 to support the bobbin 220, and the second elastic member 620 may be coupled to a lower portion of the driving frame 310 to support the bobbin 220.

The first and second elastic members 610 and 620 may elastically support the lens module 200 when the lens module 200 is driven in the optical axis direction (Z-direction).

In addition, the first and second elastic members 610 and 620 may serve to support the lens module 200 in such a manner that the lens module 200 is positioned to be parallel to a plane (X-Y plane) perpendicular to the optical axis direction (Z-direction).

The yoke plate 320 may have a hollow so as to prevent interference with movements of the lens module 200 in the optical axis direction and may be disposed below the driving frame 310.

A plurality of magnets (e.g. a first magnet 511 and a second magnet 521), components of a lens driving apparatus to be described below, may be coupled to the yoke plate 320, and the yoke plate 320 may be formed of, or comprise, a magnetic material or any material which can prevent leakage of magnetic flux.

The yoke plate 320 may include a yoke base 321 having the hollow formed therein and/or a quadrangular shape and a support plate 323 bent from the yoke base 321 and disposed between the pillar members 313.

A case 100 may be coupled to outer portions of the fixed part 400 and/or the driving part 300 to protect internal components thereof.

The case 100 may enclose outer surfaces of the driving part 300 and the fixed part 400 and may serve to shield electromagnetic waves generated when the camera module 100 is driven.

In the exemplary embodiment, the case 100 may be formed of for example, but not limited to, a metal and be grounded to a ground pad (not shown) provided on a substrate 420. Therefore, the case 100 may shield electromagnetic waves.

In addition, the case 100 may be formed of a plastic injection-molded product. In the case in which the case 100 is formed of a plastic injection-molded product, a conductive paint (not shown) may be applied to an inner surface of the case 100 to shield electromagnetic waves.

The conductive paint (not shown) may be formed of a conductive epoxy, but is not limited thereto. That is, various materials having conductivity may be used in the conductive paint, and further, a conductive film or conductive tape may be attached to the inner surface of the case 100.

Meanwhile, the camera module 1000 according to an exemplary embodiment of the present disclosure may include the auto-focusing driving part 510 and the hand-shake correcting part 520 as the lens driving apparatus.

The auto-focusing driving part 510 will be first described. The auto-focusing driving part 510 may have a structure allowing the lens module 200 to move in the optical axis direction (Z-direction). The auto-focusing driving part 510 may use, for example, but not limited to, a voice coil motor (VCM) scheme of using electromagnetic force between a coil and a magnet, an ultrasonic motor scheme of using a piezoelectric element, a scheme of applying a current to a shape memory alloy wire to perform a driving operation, and the like.

The auto-focusing driving part 510 may be disposed between the lens module 200 and the driving part 300 and may provide driving force for driving the lens module 200 in the optical axis direction (Z-direction).

In the exemplary embodiment, the auto-focusing driving part 510 may include a first magnet 511 and a first coil 513.

The first magnet 511 may be attached to an upper surface of the yoke plate 320 or an inner surface of the support plate 323 of the yoke plate 320. The first coil 513 may be provided on an outer surface of the bobbin 220.

The first magnet 511 and the first coil 513 may be disposed to face each other in the horizontal directions (X-direction and Y-direction).

The first magnet 511 may form a predetermined magnetic field, generate driving force by electromagnetic interactions with the first coil 513 when power is applied to the first coil 513, and move the lens module 200 in the optical axis direction (Z-direction) by the driving force.

The lens module 200 may be moved by the operation as described above, such that an auto focusing or zooming function may be performed.

Next, a description of the hand-shake correcting part 520 will be provided.

The hand-shake correcting part 520 may be configured to correct blurring of an image or shaking of a moving image due to a factor such as a user's hand-shake at the time of capturing the image or at the time of recording the moving image.

The hand-shake correcting part 520 may provide relative displacement of the lens module 200 in the horizontal directions (X-direction and Y-direction) to correct the hand-shake.

The hand-shake correcting part 520 may include one or more second magnets 521 provided in one of the driving part 300 and the fixed part 400 and second coils 525 disposed to face the second magnets 521 in the optical axis direction (Z-direction).

In the exemplary embodiment, the second magnets 521 may be attached to a lower surface of the yoke base 321 of the yoke plate 320, and the second coils 525 may be attached to the fixed part 400 so as to face the second magnets 521 in the optical axis direction (Z-direction).

The second magnets 521 and the second coils 525 disposed to face each other in the optical axis direction (Z-direction) may generate driving force in the horizontal directions (X-direction and Y-direction) by electromagnetic interactions therebetween.

At least two second magnets 521 and at least two second coils 525 may be provided. The second magnets 521 may be disposed to be orthogonal with respect to a magnet adjacent thereto on the plane (X-Y plane) perpendicular to the optical axis direction (Z-direction).

Since the second coils 525 are disposed to face the second magnets 521 in the optical axis direction (Z-direction), the second coils 525 may also be disposed to be orthogonal with respect to a coil adjacent thereto on the plane (X-Y plane) perpendicular to the optical axis direction (Z-direction).

Therefore, driving force in X- and Y-directions may be generated by the electromagnetic interactions between the second magnets 521 and the second coils 525.

In addition, one or more hall sensors (not shown) may be disposed in positions adjacent to the second coils 525 to sense changes in magnetic flux in the second magnets 521.

Driving operations of the driving part 300 may be controlled using information on a current position of the driving part 300 sensed by the hall sensor (not shown) and/or information on a destination position to which the driving part 300 needs to be moved.

Meanwhile, one or the plurality of suspension wires 700 may be provided in order to support the driving of the driving part 300 in the horizontal directions (X-direction and Y-direction).

The suspension wire 700 may have one end fixed to the fixed part 400 and the other end fixed to the elastic member 600.

Therefore, the plurality of suspension wires 700 may determine or maintain a gap between the driving part 300 and the fixed part 400 disposed to be spaced apart from each other in the optical axis direction (Z-direction).

The driving frame 310 and the yoke plate 320 may have notch grooves 315 and 325 formed in the respective corners thereof in order to prevent interference with the suspension wires 700.

Figure 4A:
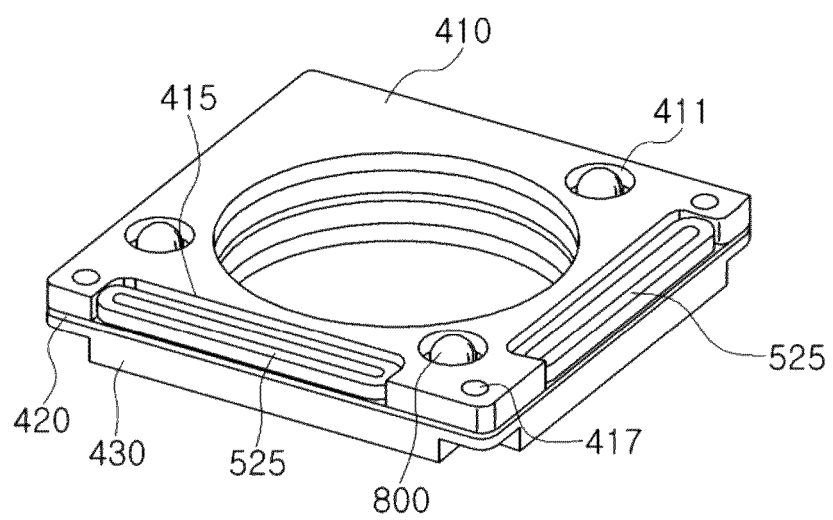
FIG. 4A is an assembled perspective view of a fixed part in the camera module according to an exemplary embodiment in the present disclosure.
Figure 4B:
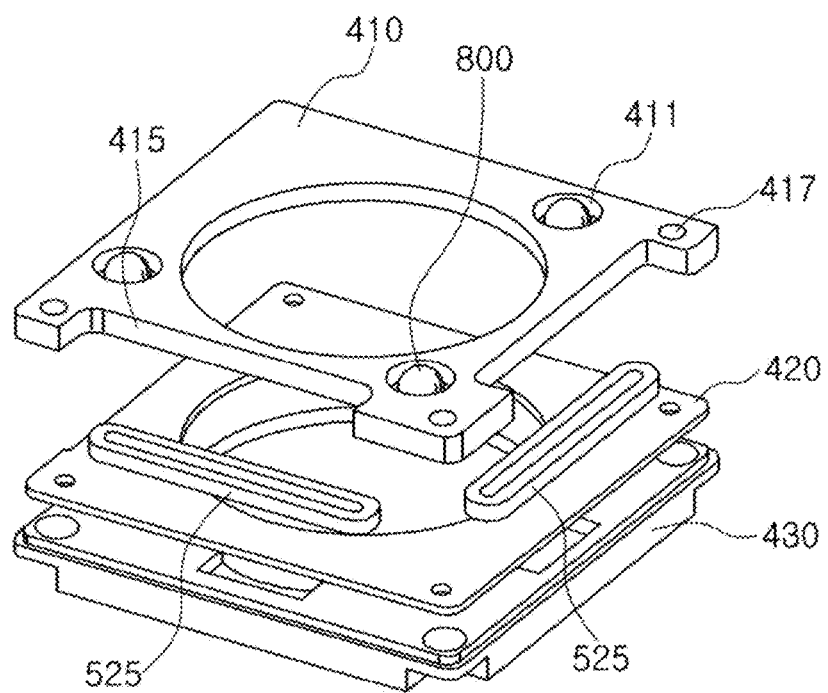
FIG. 4B is an exploded perspective view of the fixed part in the camera module according to an exemplary embodiment in the present disclosure.

FIG. 4A is an assembled perspective view of a fixed part in the camera module according to an exemplary embodiment of the present disclosure. FIG. 4B is an exploded perspective view of the fixed part in the camera module according to an exemplary embodiment of the present disclosure.

One or a plurality of ball bearings 800 and the fixed part 400 provided in the camera module 1000 according to an exemplary embodiment of the present disclosure will hereinafter be described with reference to FIGS. 4A and 4B.

In the case in which a user's hand-shake occurs, the hand-shake correcting part 520 may move or drive the driving part 300 in the horizontal directions (X-direction and Y-direction) to correct the hand-shake.

Here, when the driving part 300 is driven in the horizontal directions (X-direction and Y-direction), deformation of the suspension wires 700 such as warpage, or the like, may occur. Therefore, the driving part 300 may be inclined. As a result, driving tilt may be caused. Here, the term "driving tilt" refers to tilting of a lens in accordance with the inclination of the driving part. Further, in the case in which an external impact such as a drop impact, or the like, occurs, there may be a risk that the driving tilt may occur due to deformation of the suspension wires 700.

Therefore, in the camera module 1000 according to an exemplary embodiment of the present disclosure, one or the plurality of ball bearings 800 may be disposed between the fixed part 400 and the driving part 300 in order to prevent the driving tilt due to the deformation of the suspension wires 700.

The plurality of ball bearings 800 may be disposed between the fixed part 400 and the driving part 300 to support the driving part 300 and the fixed part 400.

Here, since the plurality of suspension wires 700 support the driving part 300 in a state in which the driving part 300 and the fixed part 400 are disposed to be spaced apart from each other in the optical axis direction (Z-direction) and the plurality of ball bearings 800 are disposed in the gap between the driving part 300 and the fixed part 400, the gap between the driving part 300 and the fixed part 400 in the optical axis direction (Z-direction) may be maintained by the plurality of suspension wires 700 and the plurality of ball bearings 800.

In addition, since one end and the other end of the suspension wire 700 are fixed or coupled to the fixed part 400 and the elastic member 600, respectively, the plurality of ball bearings 800 may be continuously in contact with, or disposed between, the driving part 300 and the fixed part 400 and may not be separated from a space between the driving part 300 and the fixed part 400.

In addition, even in the case in which an external impact, or the like, to the camera module 1000 occurs, since the driving part 300 is supported by the plurality of ball bearings 800 in a state in which the gap between the driving part 300 and the fixed part 400 in the optical axis direction (Z-direction) is maintained, the deformation of the suspension wires 700 may be prevented. Therefore, the driving part 300 may be stably moved in the horizontal directions (X-direction and Y-direction).

The fixed part 400 may include a sensor housing 430, the substrate 420 attached to an upper surface of the sensor housing 430, and a fixed frame 410 attached to an upper surface of the substrate 420.

The fixed frame 410 may be provided with accommodating parts 411 in which the plurality of ball bearings 800 are accommodated.

In the exemplary embodiment, the accommodating parts 411 may have shapes of holes penetrating through the fixed frame 410, but not limited thereto.

Therefore, the plurality of ball bearings 800 may be accommodated in the accommodating parts 411 to contact the substrate 420 and may be respectively disposed to partially protrude outwardly of the accommodating parts 411.

Therefore, the ball bearings 800 may contact the driving part 300 and the substrate 420.

Sizes of the accommodating parts 411 may be larger than diameters of the ball bearings 800. Therefore, the ball bearings 800 may roll in the accommodating parts 411 while coming into contact with the driving part 300 and the substrate 420.

The substrate 420 may be coupled to a lower portion of the fixed frame 410 and may have the upper surface thereof to which the second coils 525 are attached.

Here, the fixed frame 410 disposed on the substrate 420 may have accommodating grooves 415 formed therein to accommodate the second coils 525 therein.

Therefore, the second coils 525 may be disposed to face the second magnets 521 attached to a lower surface of the driving part 300 in the optical axis direction (Z-direction).

Meanwhile, the plurality of suspension wires 700 may penetrate through penetration holes 417 formed in the respective corners of the fixed frame 410 and may be then soldered to the substrate 420.

Next, a disposition structure of the plurality of ball bearings 800 will be described.

The upper surface of the substrate 420 contacting the plurality of ball bearings 800 may be provided as, for example, but not limited to, a flat or concave surface.

Therefore, the ball bearings 800 may roll between the driving part 300 and the fixed part 400 when the driving part 300 is moved in the horizontal directions (X-direction and Y-direction).

Since the driving part 300 is continuously in point-contact with the plurality of ball bearings 800, it may be stably driven in the horizontal directions (X-direction and Y-direction).

In addition, since the driving part 300 contacts the plurality of ball bearings 800 and is supported thereby, even in the case that external impacts, or the like, to the camera module 1000 occur, the deformation or fracturing of the suspension wires 700 may not occur. Therefore, driving characteristics and durability of the hand-shake correcting part 520 may be improved.

In the exemplary embodiment, at least three ball bearings 800 may be provided. In addition, the number of accommodating parts 411 in which the plurality of ball bearings 800 are accommodated may correspond to that of ball bearings 800.

In the case in which the three ball bearings 800 are provided, they may be disposed to be spaced apart from one another by gaps, while having angles of 120 degrees, based on the optical axis, therebetween.

However, the technical spirit of the present disclosure is not limited to the number of ball bearings 800 and the gaps between the ball bearings 800. That is, the number of ball bearings 800 and the gaps between the ball bearings 800 are not limited as long as the ball bearings 800 may support the driving part 300.

Meanwhile, the plurality of ball bearings 800 may be formed of, for example, but not limited to, a metal, and there may be a risk that a contact surface of the substrate 420 contacting the ball bearings 800 may be depressed in the case in which external impacts, or the like, to the camera module 1000 occur.

Therefore, in the camera module 1000 according to an exemplary embodiment of the present disclosure, the substrate 420 may have separate support pads (not shown) disposed on the upper surface thereof, and the support pads (not shown) may be accommodated in the accommodating parts 411 to contact the plurality of ball bearings 800.

Here, the support pads (not shown) may be formed of a metal, similarly to the case of the plurality of ball bearings 800.

Figure 5A:
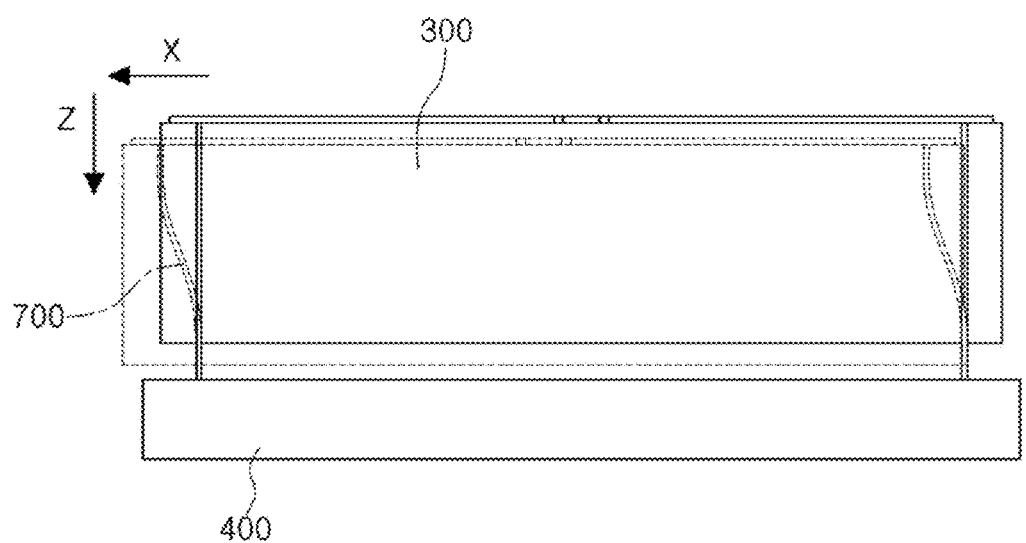
FIG. 5A is a schematic cross-sectional view showing a form in which a driving part is moved relatively with respect to the fixed part in a state in which it is supported in an optical axis direction by a plurality of suspension wires.

Next, according to an exemplary embodiment of the present disclosure, the driving operations of the driving part 300 in the horizontal directions (X-direction and Y-direction) will be described. However, with regard to the driving operations of the driving part 300, FIGS. 5A through 5D only illustrate a driving operation of the driving part 300 in the X-direction among the horizontal directions (the X-direction and the Y-direction) for convenience of explanation. FIG. 5A is a schematic cross-sectional view showing a form in which the driving part 300 is moved relatively with respect to the fixed part 400 in a state in which it is supported in an optical axis direction by a plurality of suspension wires 700.

Figure 5B:
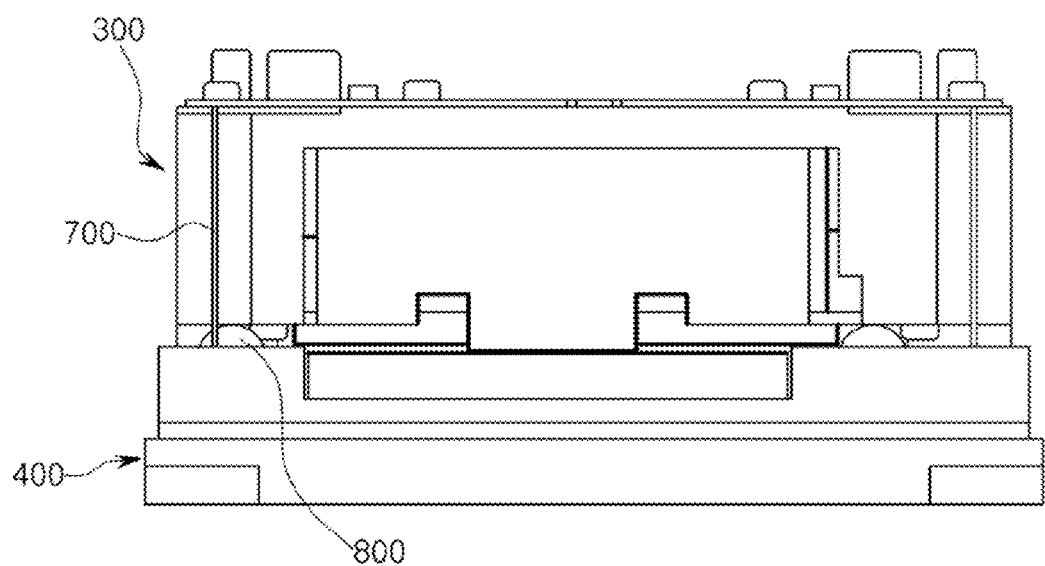
FIG. 5B is a schematic cross-sectional view showing a form in which the driving part is supported in the optical axis direction by the plurality of suspension wires and a plurality of ball bearings in the camera module according to an exemplary embodiment in the present disclosure.
Figure 5C:
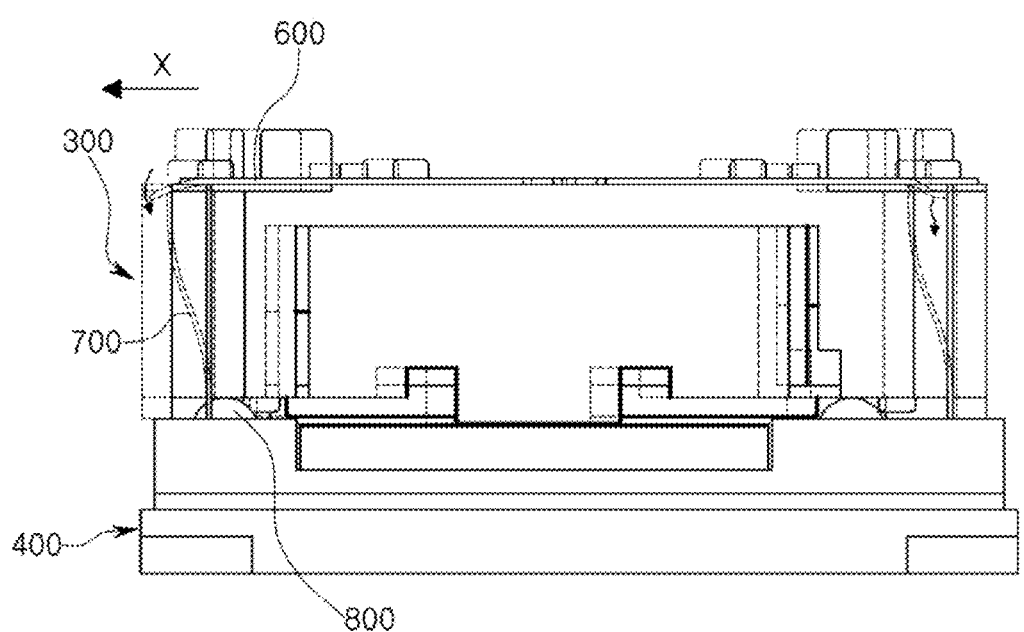
FIGS. 5C and 5D are schematic cross-sectional views showing a form in which the driving part is driven in a direction perpendicular to the optical axis direction in the camera module according to an exemplary embodiment in the present disclosure.
Figure 5D:
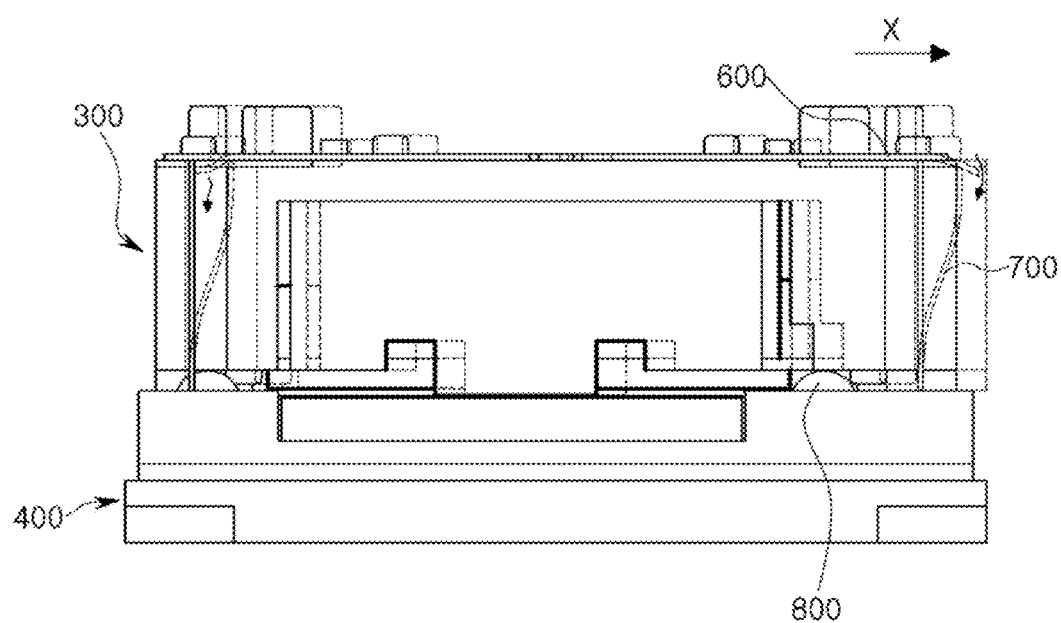

In addition, FIG. 5B is a schematic cross-sectional view showing a form in which the driving part 300 is supported in the optical axis direction by the plurality of suspension wires 700 and the plurality of ball bearings 800 in the camera module according to an exemplary embodiment of the present disclosure. FIGS. 5C and 5D are schematic cross-sectional views showing a form in which the driving part 300 is driven in a direction perpendicular to the optical axis direction in the camera module according to an exemplary embodiment of the present disclosure.

Since one end of the suspension wire 700 is fixed to the fixed part 400 and the other end thereof is fixed to the elastic member 600, the one end of the suspension wire 700 may be a fixed end and the other ends thereof may be a driving end.

Therefore, in order to correct hand-shake, the plurality of suspension wires 700 may be rotatable when the driving part 300 is driven in the horizontal directions (X-direction and Y-direction).

For example, since the elastic member 600 is attached to the driving part 300, when the driving part 300 is driven in the horizontal directions (X-direction and Y-direction), the elastic member 600 may be driven together with the driving part 300. Here, since one end of the suspension wire 700 is fixed to the fixed part 400 to be retained or coupled in a fixed state and the other end thereof is fixed to the elastic member 600 to be driven together with the elastic member 600, the other end of the suspension wire 700 may be rotatable around the one end thereof fixed to the fixed part 400.

Referring to FIG. 5A, in the case in which the driving part 300 and the fixed part 400 spaced apart from each other in the optical axis direction (Z-direction) are supported by only the plurality of suspension wires 700, the driving part 300 may be driven in both the horizontal directions (X-direction and Y-direction) and the optical axis direction (Z-direction) by driving force of the hand-shake correcting part 520 in the horizontal directions (X-direction and Y-direction).

That is, the elastic member 600 to which the other ends of the plurality of suspension wires 700 are fixed and the driving part 300 may be rotated by rotation of the suspension wires 700. Therefore, the driving part 300 may be driven in both the horizontal directions (X-direction and Y-direction) and the optical axis direction (Z-direction).

However, as shown in FIGS. 5B through 5D, in the camera module 1000 according to an exemplary embodiment of the present disclosure, the driving part 300 and the fixed part 400 disposed to be spaced apart from each other in the optical axis direction (Z-direction) may be supported by the plurality of ball bearings 800 as well as the plurality of suspension wires 700.

Therefore, even in the case that the plurality of suspension wires 700 are rotated, the gap between the driving part 300 and the fixed part 400 in the optical axis direction (Z-direction) may be constantly maintained by the plurality of ball bearings 800, such that the elastic member 600 to which the other ends of the suspension wires 700 are fixed may be elastically deformed in the optical axis direction.

That is, as the suspension wires 700 are rotated, portions of the elastic member 600 to which the other ends of the plurality of suspension wires 700 are fixed may be moved in the optical axis direction (Z-direction).

When the driving part 300 is driven in the horizontal directions (X-direction and Y-direction), the elastic member 600 is elastically deformed in the optical axis direction (Z-direction), such that pressure directed toward the fixed part 400 may be generated in the elastic member 600. As a result, pressure may be applied to the driving part 300 coupled to the elastic member 600 to be moved toward the fixed part 400.

Here, one or the plurality of ball bearings 800 disposed between the driving part 300 and the fixed part 400 may roll between the driving part 300 and the fixed part 400 while pressure is exerted thereon by the driving part 300.

In the case in which portions of the driving part 300 to which the suspension wires 700 are fixed are not elastically deformed in the optical axis direction (Z-direction) in response to the driving of the driving part 300 in the horizontal directions (X-direction and Y-direction), the rolling of the plurality of ball bearings 800 disposed between the driving part 300 and the fixed part 400 may be hindered by pressure of the driving part 300, and there may be a risk that internal components may be damaged by the pressure applied to the plurality of ball bearings 800.

However, in the camera module 1000 according to an exemplary embodiment of the present disclosure, since the elastic member 600 is elastically deformed in the optical axis direction (Z-direction) depending on the driving of the driving part 300 in the horizontal direction, even in the case that pressure is exerted on the driving part 300 toward the fixed part 400, the plurality of ball bearings 800 may freely roll between the driving part 300 and the fixed part 400.

In addition, since the plurality of ball bearings 800 roll between the driving part 300 and the fixed part 400, while pressure is exerted thereon by the driving part 300, reliability of the camera module 1000 against external impacts, or the like, may be further improved, separation of the plurality of ball bearings 800 may be prevented, and the plurality of ball bearings 800 may roll in a stable manner.

Figure 6:
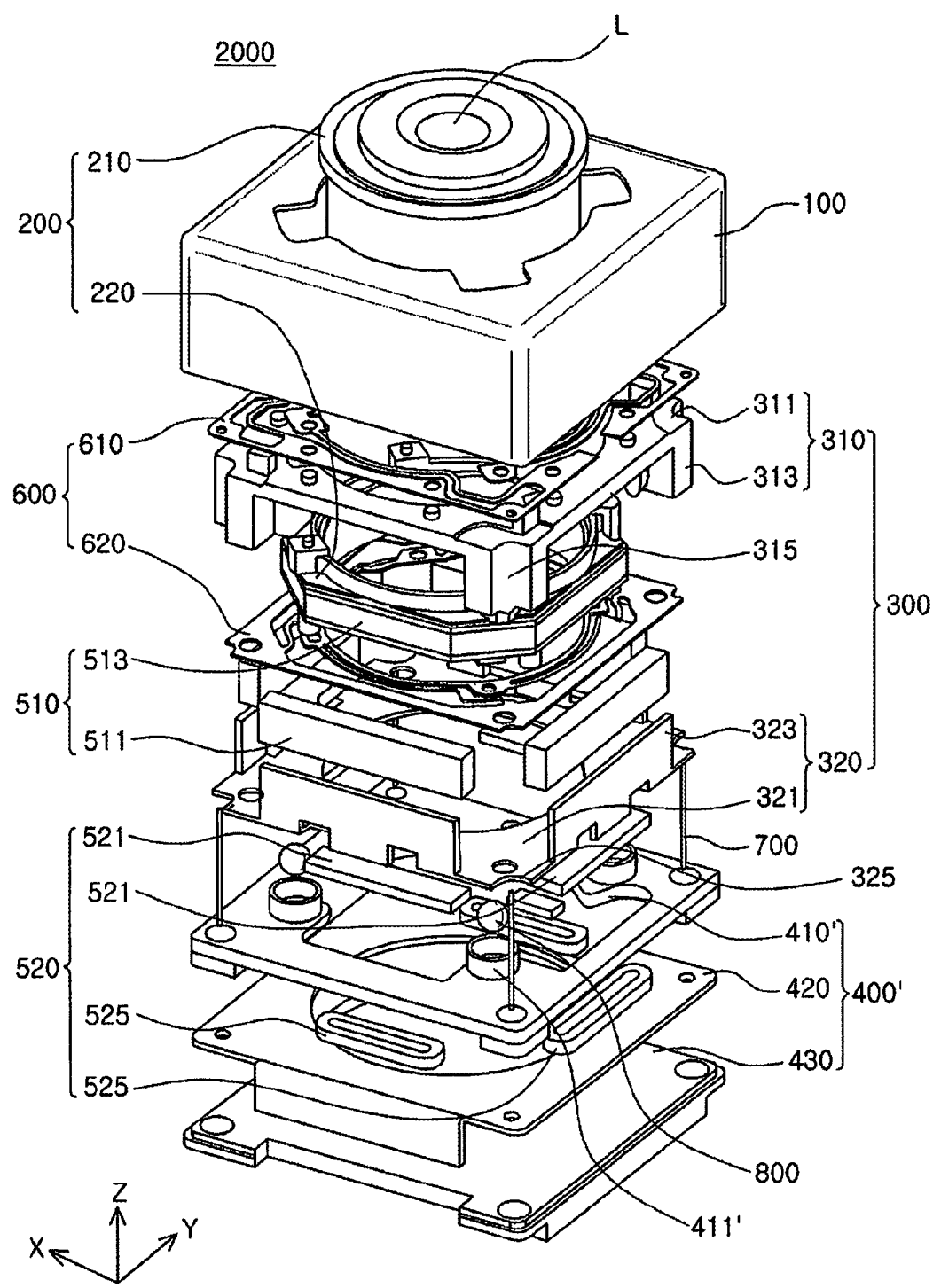
FIG. 6 is an exploded perspective view of a camera module according to another exemplary embodiment in the present disclosure.
Figure 7:
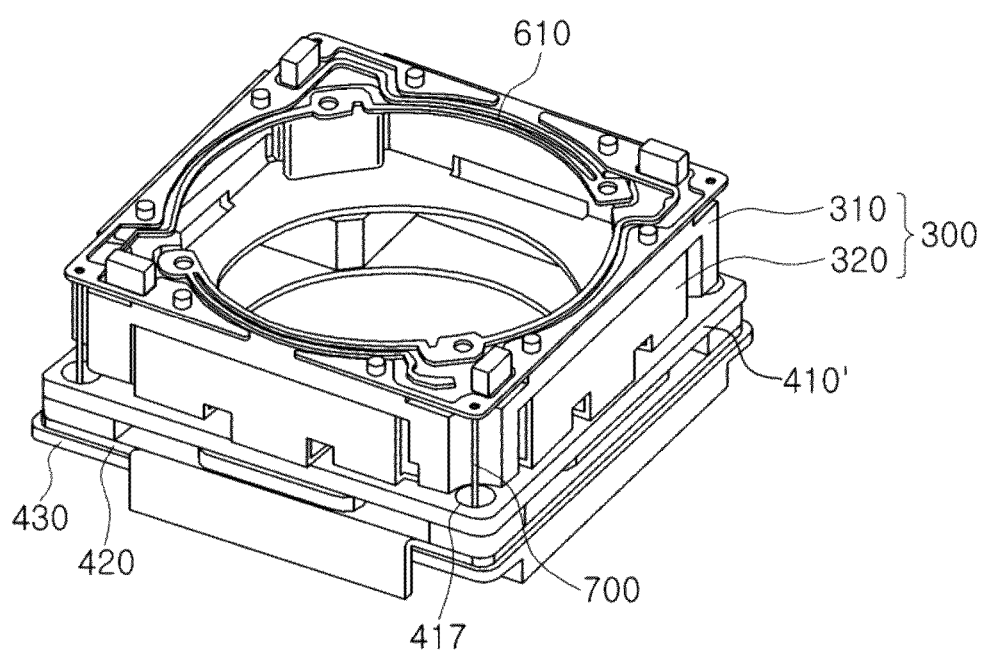
FIG. 7 is a partially assembled perspective view of the camera module according to another exemplary embodiment in the present disclosure.
Figure 8:
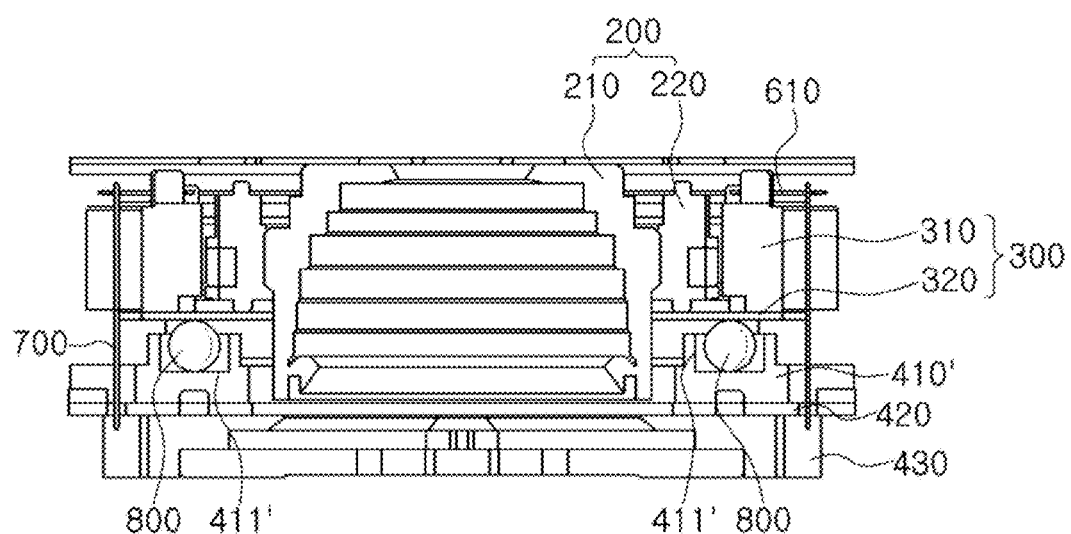
FIG. 8 is a cross-sectional view of the camera module according to another exemplary embodiment in the present disclosure.

FIG. 6 is an exploded perspective view of a camera module according to another exemplary embodiment of the present disclosure. FIG. 7 is a partially assembled perspective view of the camera module according to another exemplary embodiment of the present disclosure. FIG. 8 is a cross-sectional view of the camera module according to another exemplary embodiment of the present disclosure.

Figure 9A:
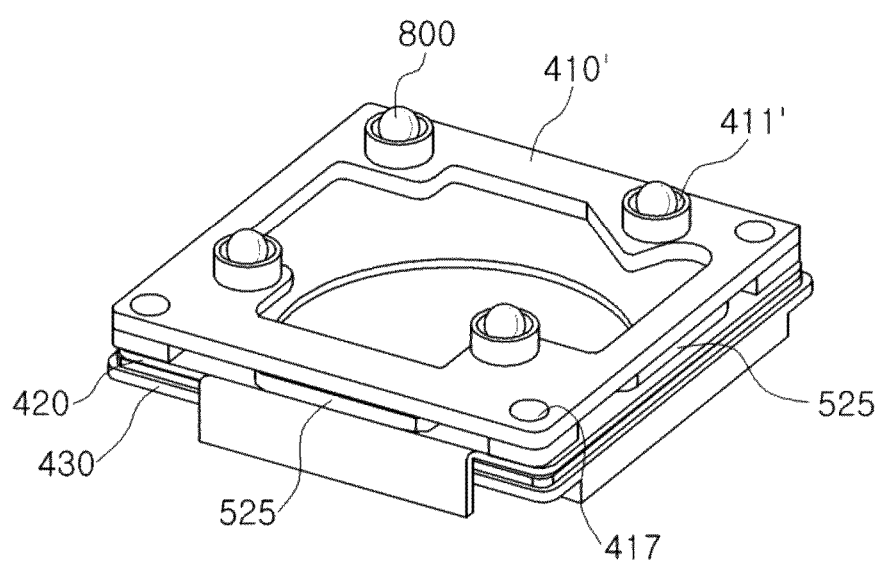
FIG. 9A is an assembled perspective view of a fixed part in the camera module according to another exemplary embodiment of the present disclosure.
Figure 9B:
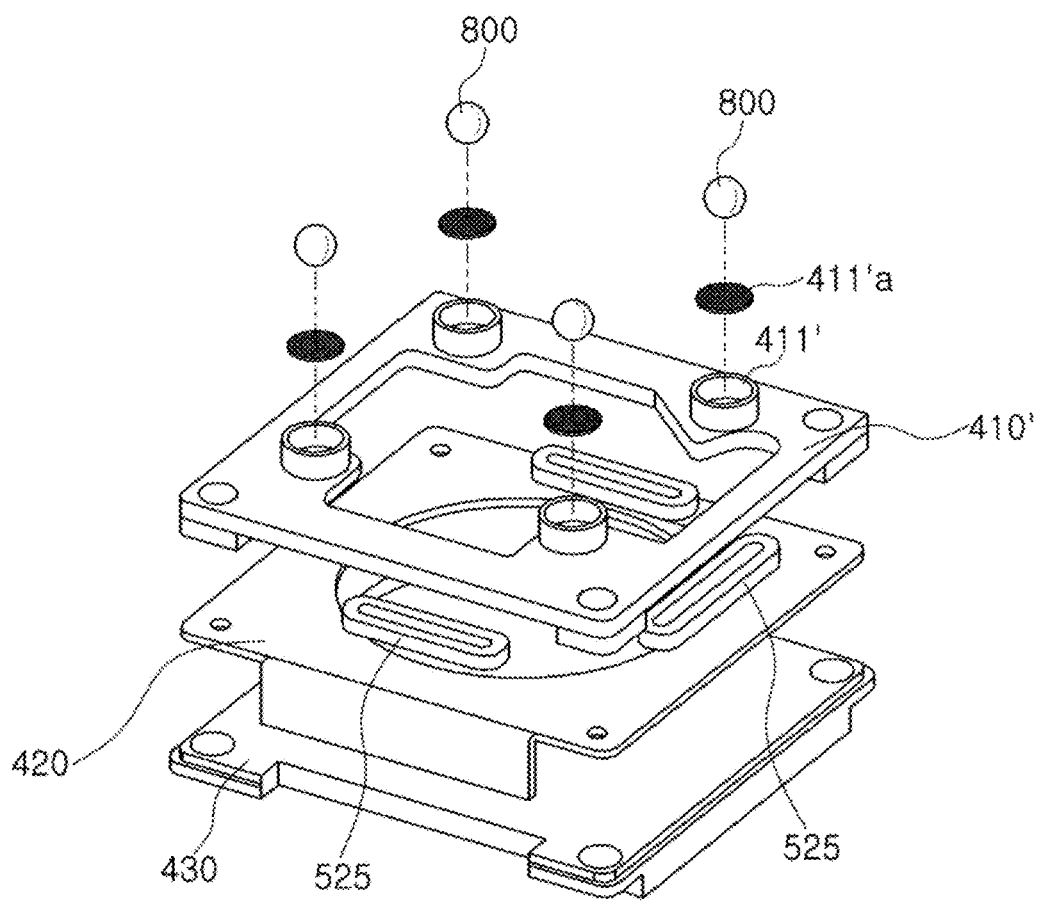
FIG. 9B is an exploded perspective view of the fixed part in the camera module according to another exemplary embodiment in the present disclosure.

In addition, FIG. 9A is an assembled perspective view of a fixed part in the camera module according to another exemplary embodiment of the present disclosure. FIG. 9B is an exploded perspective view of the fixed part in the camera module according to another exemplary embodiment of the present disclosure.

Referring to FIGS. 6 through 9B, a camera module 2000 according to another exemplary embodiment of the present disclosure is the same as or similar with the camera module 1000 according to an exemplary embodiment of the present disclosure described above except for a structure of a fixed part 400'. Therefore, descriptions of components except for the fixed part 400' will be omitted.

The fixed part 400' of the camera module 2000 according to another exemplary embodiment of the present disclosure may include the sensor housing 430, the substrate 420 attached to the upper surface of the sensor housing 430, and a fixed frame 410' attached to the upper surface of the substrate 420.

The fixed frame 410' may be provided with accommodating parts 411' in which the plurality of ball bearings 800 are accommodated.

In the exemplary embodiment, one or more accommodating parts 411' may have groove shapes, but not limited thereto.

Although a case in which grooves are formed in protruding parts of the fixed frame 410' is shown in FIGS. 6 through 9B, the present disclosure is not limited thereto. That is, the accommodating parts 411' may also be depressed downwardly from an upper surface of the fixed frame 410' in the optical axis direction (Z-direction).

One or the plurality of ball bearings 800 may be accommodated in the accommodating parts 411' and may contact bottom surfaces of the accommodating parts 411'.

For example, the plurality of ball bearings 800 may be formed of a metal, and the fixed frame 410' in which the plurality of ball bearings 800 are accommodated may be a plastic injection-molding product. Therefore, in the case in which external impacts, or the like, to the camera module 2000 occur, there may be a risk that contact surfaces (that is, the bottom surfaces of the accommodating parts 411') between the plurality of ball bearings 800 and the fixed frame 410' may be depressed.

Therefore, in the camera module 2000 according to another exemplary embodiment of the present disclosure, separate support pads 411'a may be provided on the bottom surfaces of the accommodating parts 411'.

That is, the support pads 411'a may be disposed within the accommodating parts 411' formed in the fixed frame 410', and the plurality of ball bearings 800 may be accommodated in the accommodating parts 411' to contact the support pads 411'a.

Here, the support pads 411' a may be formed of a metal, similarly to that of the plurality of ball bearings 800.

Figure 10:
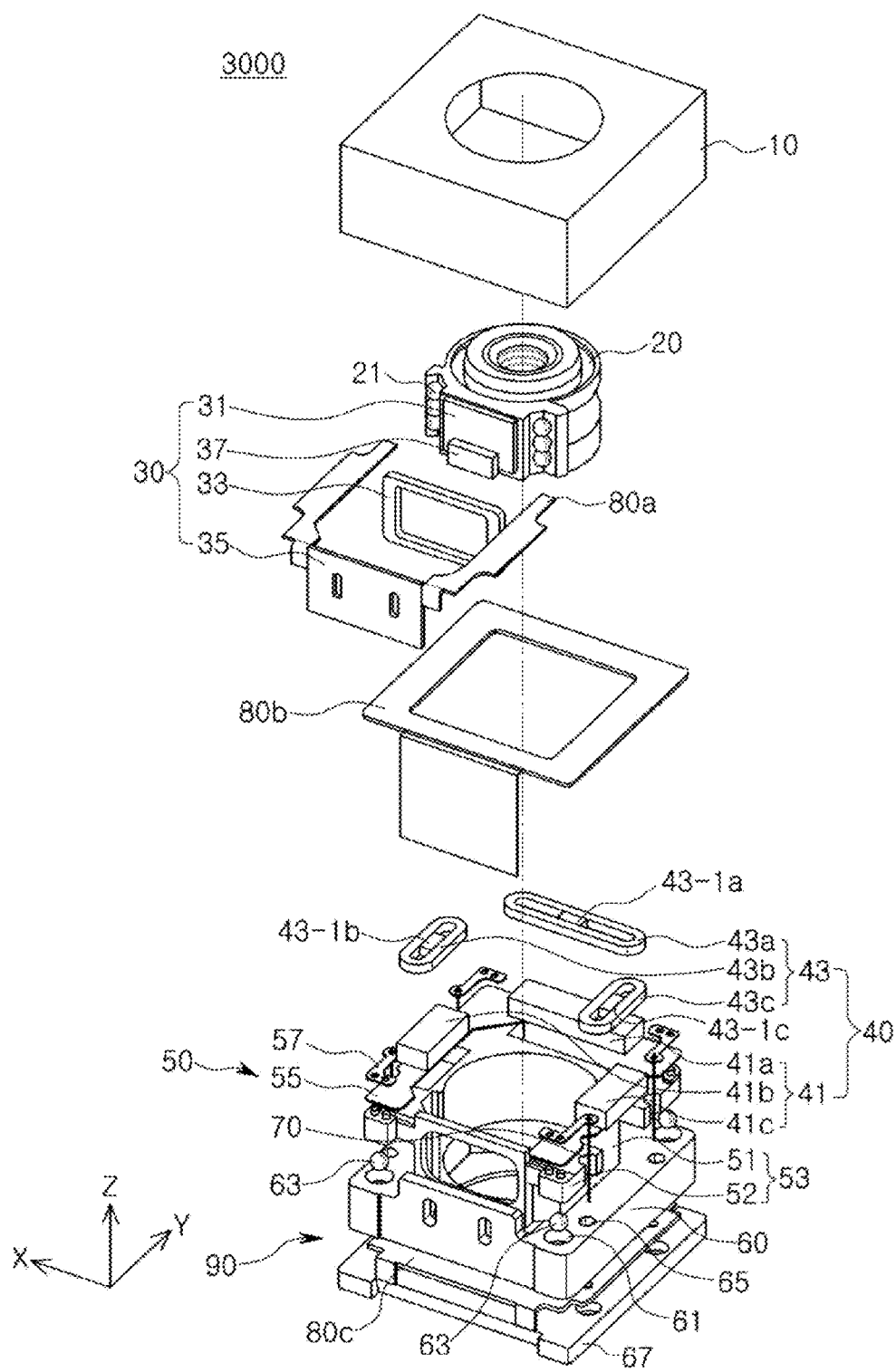
FIG. 10 is an exploded perspective view of a camera module according to another exemplary embodiment in the present disclosure.
Figure 11:
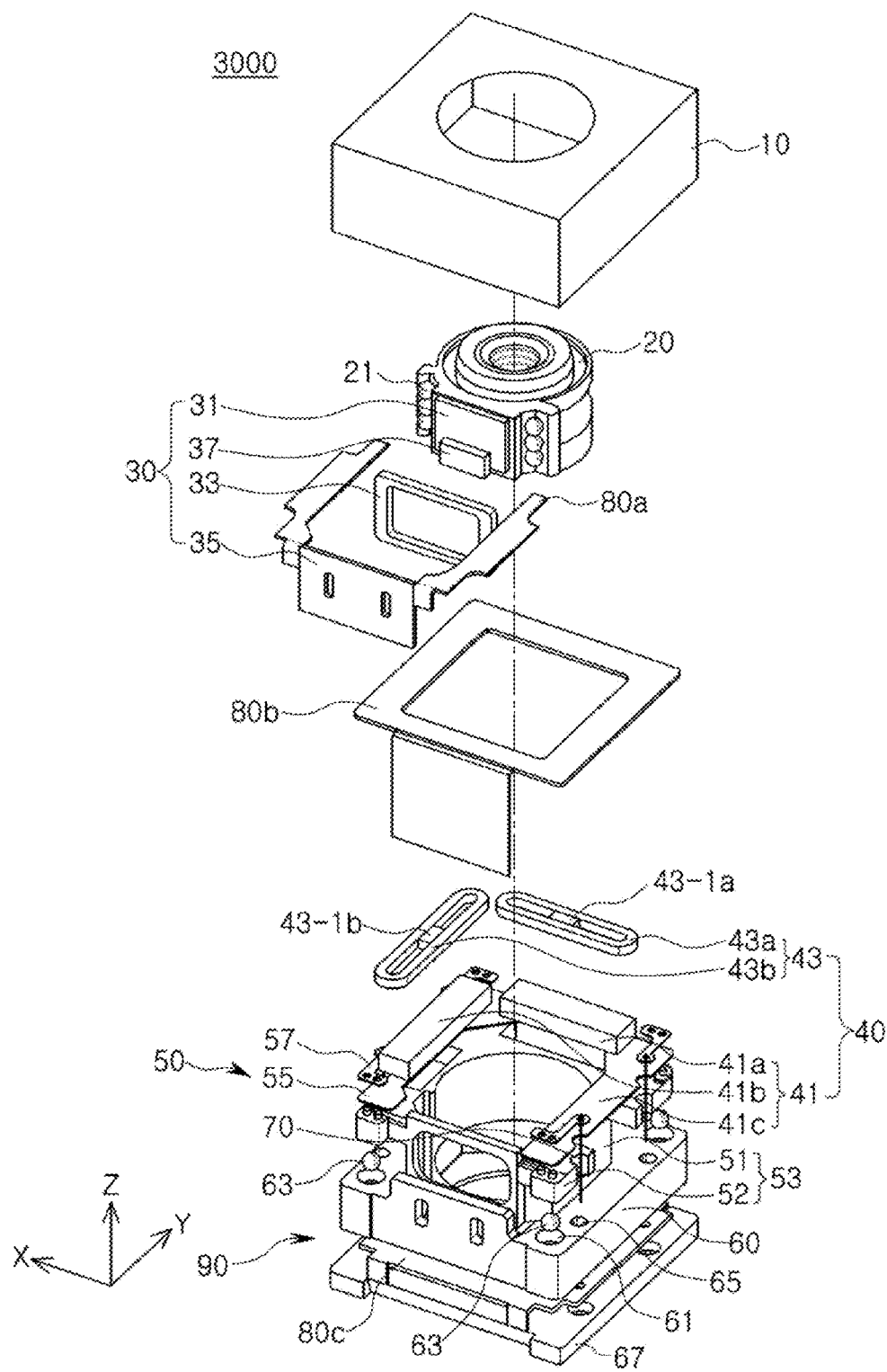
FIG. 11 is an exploded perspective view of the camera module according to another exemplary embodiment of the present disclosure in which a modified example in a handshake correcting part is shown.
Figure 12:
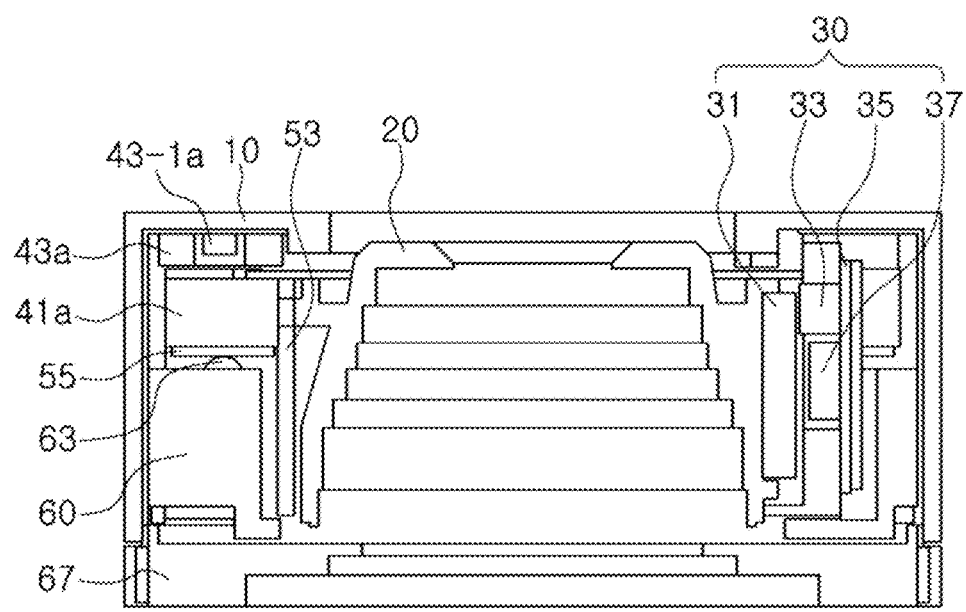
FIG. 12 is a cross-sectional view of the camera module according to another exemplary embodiment in the present disclosure.

FIG. 10 is an exploded perspective view of a camera module according to another exemplary embodiment of the present disclosure. FIG. 11 is an exploded perspective view of the camera module according to another exemplary embodiment of the present disclosure, in which a modified example of a hand-shake correcting part is shown. FIG. 12 is a cross-sectional view of the camera module according to another exemplary embodiment of the present disclosure.

A camera module 3000 according to another exemplary embodiment of the present disclosure will be described with reference to FIGS. 10 through 12.

The camera module 3000 according to another exemplary embodiment of the present disclosure may include a lens barrel 20, a driving part 50, a fixed part 90, an auto-focusing driving part 30, a hand-shake correcting part 40, and a case 10.

The lens barrel 20 may have a hollow cylindrical shape to allow a plurality of lenses L, for imaging a subject, may be accommodated therein, and the plurality of lenses L may be provided in the lens barrel 20 along an optical axis.

A required number of lenses L may be stacked and the respective lenses L may have various optical characteristics such as the same refractive index or different refractive indices.

The lens barrel 20 may be accommodated in or coupled to the driving part 50.

Here, the lens barrel 20 may be driven in the optical axis direction (Z-direction) for auto-focusing within the driving part 50.

To this end, the camera module 3000 according to another exemplary embodiment of the present disclosure may include the auto-focusing driving part 30 disposed on one side of the lens barrel 20.

The auto-focusing driving part 30 may include a first magnet 31 provided on one surface of the lens barrel 20 and a first coil 33 disposed to face the first magnet 31.

The first coil 33 may move the lens barrel 20 in the optical axis direction by electromagnetic force generated between the first coil 33 and the first magnet 31 adjacent thereto.

The first magnet 31 may form a predetermined magnetic field, generate driving force by electromagnetic interactions with the first coil 33 when power is applied to the first coil 33, and move the lens barrel 20 in the optical axis direction by the driving force.

In addition, the first coil 33 may be fixed to a first yoke 35 inserted into one side of the fixed part 90, and a first substrate 80a may be extended from the first yoke 35 so as to apply the power to the first coil 33.

The first yoke 35 may fix the first coil 33 thereto and prevent leakage of magnetic flux.

A hall sensor 37 may be inserted into the center of the first coil 33 and may sense a change in magnetic flux of the first magnet 31.

Driving operations of the lens barrel 20 in the optical axis direction may be controlled using information on a current position of the lens barrel 20 sensed by the hall sensor 37 and/or information on a destination position to which the lens barrel 20 needs to be moved.

The driving part 50 may include a driving frame 53 partially accommodated in the fixed part 90, a second yoke 55 attached to an upper portion of the driving frame 53, and plates 57 fixing the second yoke 55 to the driving frame 53.

The plates 57 may be provided as elastic members having elastic force.

The driving part 50 is configured to support the lens barrel 20 and may accommodate the lens barrel 20 therein.

Therefore, the driving part 50 may have an internal space formed therein so as to accommodate the lens barrel 20 therein, and may have one open side such that the first magnet 31 attached to the lens barrel 20 faces the first coil 33 fixed to the first yoke 35 in the horizontal direction (X-direction and Y-direction). That is, the driving part 50 may have one open side in a position corresponding to one surface of the lens barrel 20 on which the first magnet 31 is disposed.

Meanwhile, as a guide means for guiding the driving of the lens barrel 20 when the lens barrel 20 is moved in the optical axis direction (Z-direction) within the driving part 50, one or a plurality of ball members 21 may be provided in the optical axis direction or in a direction perpendicular to the optical axis within the lens barrel 20.

The plurality of ball members 21 may be disposed in positions adjacent to the first magnet 31 and contact an inner surface of the driving part 50 to guide movements of the lens barrel 20 in the optical axis direction.

That is, the plurality of ball members 21 may be disposed between the lens barrel 20 and the driving part 50 and support the movements of the lens barrel 20 in the optical axis direction through rolling movements of the ball members 21.

Therefore, during an auto-focusing process, the ball members 21 may support the lens barrel 20, such that the lens barrel 20 may move in a direction parallel to the optical axis.

The camera module 300 according to another exemplary embodiment of the present disclosure may include the hand-shake correcting part 40 in order to compensate for shaking of the lens barrel 20 in the horizontal directions (X-direction and Y-direction) perpendicular to the optical axis direction (Z-direction), due to a user's hand-shake.

The hand-shake correcting part 40 may be configured to correct blurring of an image or shaking of a moving image due to a factor such as a user's hand-shake at the time of capturing the image or at the time of recording the moving image.

That is, the hand-shake correcting part 40 may provide relative displacement of the lens barrel 20 in the horizontal directions (X-direction and Y-direction) to correct the hand-shake.

The hand-shake correcting part 40 may be disposed above the driving part 50 and may generate driving force in the horizontal directions (X-direction and Y-direction) to drive the driving part 50 in the horizontal directions (X-direction and Y-direction).

Since the lens barrel 20 is accommodated in the driving part 50, the hand-shake correcting part 40 may drive the lens barrel 20 in the horizontal directions (X-direction and Y-direction) by.

The hand-shake correcting part 40 may generate the driving force in the horizontal directions (X-direction and Y-direction) by electromagnetic interactions generated between a magnet part 41 and a coil part 43 enclosing the other side of the lens barrel 20, and move the driving part 50 in the horizontal directions (X-direction and Y-direction) by the driving force.

For example, referring to FIG. 10, the hand-shake correcting part 40 may include a second magnet 41a and third magnets 41b and 41c disposed on an upper portion of the driving part 50 to enclose the other side of the lens barrel 20, and a second coil 43a and third coils 43b and 43c disposed to face the second magnet 41a and the third magnets 41b and 41c, respectively.

The second yoke 55 may be disposed below the second magnet 41a and/or the third magnets 41b and 41c, and be formed of a magnetic material or any material which can prevent magnetic flux of the second magnet 41a and the third magnets 41b and 41c from being leaked.

The second yoke 55 may have one or more plates 57 disposed in respective corners of an upper portion thereof in order to fix a position of the second yoke 55. Therefore, the second yoke 55 may be fixed to the upper portion of the driving frame 53 by the plates 57.

The second magnet 41a may be disposed on an opposite side of the first magnet 31 based on the optical axis. In addition, the third magnets 41b and 41c may include two magnets disposed in parallel with each other and these two magnets may be disposed on opposite sides to each other based on the optical axis. Therefore, the lens barrel 20 may be enclosed by the first magnet 31, the second magnet 41a, and the third magnets 41b and 41c.

The third coils 43b and 43c may include two coils disposed in parallel with each other, similarly to the case of the third magnets 41b and 41c and these two coils may be disposed on opposite sides to each other based on the optical axis.

In the camera module 3000 according to another exemplary embodiment of the present disclosure, the second magnet 41a and the third magnets 41b and 41c may be disposed to be orthogonal with respect to each other on a plane perpendicular to the optical axis direction, and the second coil 43a and the third coils 43b and 43c may be disposed to be orthogonal with respect to each other on the plane perpendicular to the optical axis direction, in order to generate driving force in directions perpendicular with respect to each other.

The second coil 43a and the third coils 43b and 43c may be attached to a lower surface of a second substrate 80b to face the second magnet 41a and the third magnets 41b and 41c, respectively, in the optical axis direction. One side of the second substrate 80b may be bent downwardly in the optical axis direction and be inserted into one side of the fixed part 90.

The driving part 50 may be driven in the horizontal directions (X-direction and Y-direction) by electromagnetic interactions generated between the second magnet 41a and the second coil 43a facing each other and/or between the third magnets 41b and 41c and the third coils 43b and 43c facing each other.

Hall sensors 43-1a, 43-1b, and 43-1c may be inserted into central portions of the second coil 43a and the third coils 43b and 43c, respectively, and may sense changes in magnetic fluxes of the second magnet 41a and the third magnets 41b and 41c.

Driving operations of the driving part 50 may be controlled using information on a current position of the driving part 50 sensed by the hall sensor 43-1a, 43-1b, and 43-1c and information on a destination position to which the driving part 50 needs to be moved.

In the camera module 3000 according to another exemplary embodiment, while one second magnet 41a and one second coil 43a are provided, two third magnets 41b and 41c and two third coils 43b and 43c are provided. Accordingly, a degree of electromagnetic force generated between the second magnet 41a and the second coil 43a and a degree of electromagnetic force generated between the third magnets 41b and 41c and the third coils 43b and 43c may be different from each other. Therefore, a difference in driving force may be caused in the directions (X-direction and Y-direction) perpendicular to the optical axis direction.

In order to prevent such a difference, a length of the second magnet 41a may be greater than those of the third magnets 41b and 41c, and a length of the second coil 43a may also be greater than those of the third coils 43b and 43c.

Although the case in which the two third magnets 41b and 41c and the two third coils 43b and 43c are provided is shown in FIG. 10, the present disclosure is not limited thereto. That is, a single third magnet 41b and a single third coil 43b may also be provided, similarly to the case of the second magnet 41a and the second coil 43a.

For example, referring to FIG. 11, the hand-shake correcting part 40 may include the second magnet 41a and the third magnet 41b disposed on the upper portion of the driving part 50 to enclose the other side of the lens barrel 20 and the second coil 43a and the third coil 43b disposed to face the second magnet 41a and the third magnet 41b, respectively.

In an exemplary embodiment shown in FIG. 11, lengths of the second and third magnets 41a and 41b may be substantially identical to each other, and lengths of the second and third coils 43a and 43b may also be substantially identical to each other.

The driving part 50 may be accommodated in the fixed part 90 and be movable relatively with respect to the fixed part 90 in the horizontal directions (X-direction and Y-direction).

That is, the fixed part 90 may be a fixed member supporting the driving part 50 when the driving part 50 is driven in the horizontal directions (X-direction and Y-direction).

One or a plurality of suspension wires 70 may be provided in order to support the driving of the driving part 50 in the horizontal directions (X-direction and Y-direction).

The suspension wire 70 may have one end fixed to the fixed part 90 and the other end fixed to the plates 57.

Therefore, the plurality of suspension wires 70 may determine or maintain a gap between the driving part 50 and the fixed part 90 disposed to be spaced apart from each other in the optical axis direction (Z-direction).

One or a plurality of ball bearings 63 may be provided in an upper surface of the fixed part 90 and the ball bearings 63 may contact and support the driving part 50. That is, the plurality of ball bearings 63 may be disposed between the driving part 50 and the fixed part 90 to support relative movements of the driving part 50.

Since the driving part 50 accommodating the lens barrel 20 therein is supported by the plurality of ball bearings 63 and the plurality of suspension wires 70, the driving part 50 may be stably moved in the horizontal directions (X-direction and Y-direction).

That is, since the suspension wires 70 support the driving part 50 in a state in which the driving part 50 and the fixed part 90 are spaced apart from each other in the optical axis direction (Z-direction) and the ball bearings 63 are disposed in the gap between the driving part 50 and the fixed part 90, the gap between the driving part 50 and the fixed part 90 in the optical axis direction (Z-direction) may be maintained by the plurality of suspension wires 70 and the plurality of ball bearings 63.

Therefore, the driving tilt that may occur when the driving part 50 is driven in the horizontal directions (X-direction and Y-direction) may be prevented.

In addition, since the driving part 50 may be supported by the plurality of ball bearings 63, even in the case that external impacts, or the like, to the camera module 3000 occur, the deformation or fracturing of the suspension wires 70 may not occur. Therefore, driving characteristics and durability of the hand-shake correcting part 40 may be improved.

The driving frame 53 may include a body part 51 accommodated in the fixed part 90 and an extension part 52 extended from an upper portion of the body part 51 in the horizontal directions (X-direction and Y-direction).

The extension part 52 may be disposed to be spaced apart from the fixed part 90 in the optical axis direction (Z-direction), and the plurality of ball bearings 63 may be disposed between the extension part 52 and the fixed part 90.

The fixed part 90 may include a fixed frame 60 accommodating the ball bearings 63 therein, a third substrate 80*c* disposed below the fixed frame 60, and a sensor housing 67 disposed below the third substrate 80*c*.

The third substrate 80*c* may be electrically connected to the first and second substrates 80*a* and 80*b* to apply power to the first and second substrates 80*a* and 80*b*.

The fixed frame 60 may have accommodating parts 61 formed in an upper surface thereof, and the accommodating parts 61 have the plurality of ball bearings 63 inserted thereinto. In the exemplary embodiment, the accommodating parts 61 may groove shapes, and the plurality of ball bearings 63 may be respectively inserted into the accommodating parts 61 so as to partially protrude upwardly of the accommodating parts 61.

Therefore, the plurality of ball bearings 63 may contact a lower surface of the extension part 52 and bottom surfaces of the accommodating parts 61, and the driving part 50 and the fixed part 90 may be disposed to be spaced apart from each other in the optical axis direction by the plurality of ball bearings 63.

The bottom surfaces of the accommodating parts 61 contacting the plurality of ball bearings 63 may be provided as, for example, but not limited to, a flat or concave surface.

Therefore, the ball bearings 63 may roll within the accommodating parts 61 when the driving part 50 is moved in the horizontal directions (X-direction and Y-direction).

The plurality of ball bearings 63 may be disposed so as not to be separated from a space between the driving part 50 and the fixed part 90 by the plurality of suspension wires 70.

The fixed frame 60 may have a plurality of guide holes 65 formed therein so that the plurality of suspension wires 70 pass therethrough.

The suspension wires 70 may pass through the plurality of guide holes 65, such that one end thereof is fixed to the third substrate 80*c* of the fixed part 90 and the other end thereof is fixed to the plates 57 of the driving part 50.

Here, the plates 57 may be provided as elastic members having elastic force and be partially deformed elastically in the optical axis direction (Z-direction) depending on the driving of the driving part 50 in the horizontal directions (X-direction and Y-direction).

Since a description of the plates 57 is identical to a similar with that described above with reference to FIGS. 5A through 5D, it will be omitted.

For example, at least three ball bearings 63 may be provided.

In the case in which three ball bearings 63 are provided, they may be disposed to be spaced apart from one another by gaps, while having angles of 120 degrees, based on the optical axis.

However, the technical spirit of the present disclosure is not limited to the number of ball bearings 63 and the gaps between the ball bearings 63. That is, the number of ball bearings 63 and the gaps between the ball bearings 63 are not limited as long as the ball bearings 63 may support the driving part 50.

Meanwhile, the plurality of ball bearings 63 may be formed of, for example, but not limited to, a metal, and the fixed frame 60 in which the plurality of ball bearings 63 are mounted may be a plastic injection-molding product. Therefore, in the case in which external impacts, or the like, to the camera module 3000 occur, there may be a risk that contact surfaces (that is, the bottom surfaces of the accommodating parts 61) between the plurality of ball bearings 63 and the fixed frame 60 may be depressed.

Therefore, in the camera module 3000 according to another exemplary embodiment of the present disclosure, separate support pads (not shown) may be provided on the bottom surfaces of the accommodating parts 61.

Therefore, the plurality of ball bearings 63 may be accommodated in the plurality of accommodating parts 61 to contact the support pads (not shown).

Here, the support pads (not shown) may be formed of a metal, similarly to that of the plurality of ball bearings 63.

The case 10 may be coupled to outer portions of the fixed part 90 and/or the driving part 50 to protect internal components thereof.

The case 10 may enclose outer surfaces of the driving part 50 and the fixed part 90 and may serve to shield electromagnetic waves generated when the camera module is driven.

That is, when the camera module 3000 is driven, electromagnetic waves may be generated, and in the case in which the electromagnetic waves are outwardly discharged, the electromagnetic waves may have influences on other electronic components to cause a communications error or a malfunction.

In the exemplary embodiment, the case 10 may be formed of a metal to thereby be grounded to a ground pad (not shown) provided on the third substrate 80*c*. Therefore, the case 10 may shield the electromagnetic waves.

In addition, the case 10 may be formed of a plastic injection-molded product. In the case in which the case 10 is formed of a plastic injection-molded product, a conductive paint (not shown) may be applied to an inner surface of the case 10 to shield the electromagnetic waves.

The conductive paint (not shown) may be formed of a conductive epoxy, but is not limited thereto. That is, various materials having conductivity may be used in the conductive paint and further, a conductive film or conductive tape may be attached to the inner surface of the case 10.

Figure 13:
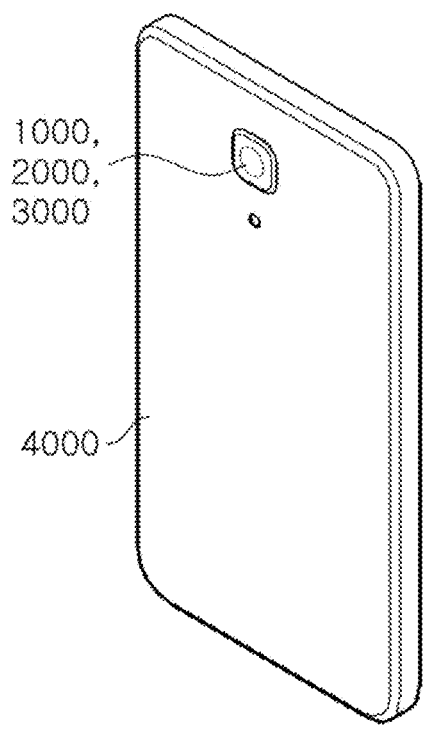
FIG. 13 is a perspective view of a portable electronic device including the camera module according to an exemplary embodiment in the present disclosure.

FIG. 13 is a perspective view of a portable electronic device including the camera module according to an exemplary embodiment of the present disclosure.

Referring to FIG. 13, a portable electronic device according to an exemplary embodiment of the present disclosure may include a body part 4000 and the camera module 1000, 2000, or 3000.

The camera module 1000, 2000, or 3000 may have all features of the camera modules according to the foregoing exemplary embodiments of the present disclosure and may be coupled to the body part 4000.

As set forth above, in the camera module and the portable electronic device including the same according to exemplary embodiments of the present disclosure, the occurrence of tilting of a lens when the driving part including the lens module is driven in the direction perpendicular to the optical axis direction during correcting the hand-shake may be suppressed.

In addition, the deformation or the fracturing of the suspension wire due to an external influence such as external impacts, or the like, to the camera module may be prevented.

While exemplary embodiments have been shown and described above, it will be apparent to those skilled in the art that modifications and variations could be made without departing from the spirit and scope of the present disclosure as defined by the appended claims.

What is claimed is:

1. A camera module comprising:
   a fixed part;
   a driving part accommodating a lens module therein, disposed to be spaced apart from the fixed part in an optical axis direction, and relatively movable with respect to the fixed part in a direction perpendicular to the optical axis direction;
   a plurality of ball bearings disposed between the fixed part and the driving part;
   an elastic member attached to the driving part; and
   a plurality of suspension wires, each having one end fixed to the fixed part and another end fixed to the elastic member,
   wherein portions of the elastic member, to which the another ends of suspension wires are fixed, are configured to be elastically deformed in the optical axis direction when the driving part is moved in the direction perpendicular to the optical axis direction.

2. The camera module of claim 1, wherein the suspension wires are rotatably fixed to the fixed part and the elastic member.

3. The camera module of claim 2, wherein one or more portions of the elastic member to which the other ends of the suspension wires are fixed are movable in the optical axis direction in accordance with the rotation of the suspension wires.

4. The camera module of claim 1, wherein the ball bearings comprise at least three ball bearings.

5. The camera module of claim 1, wherein the ball bearings contact and support the driving part and the fixed part.

6. The camera module of claim 1, wherein the ball bearings are rollable between the driving part and the fixed part.

7. The camera module of claim 1, wherein the fixed part includes a sensor housing, a substrate attached to a surface of the sensor housing, and a fixed frame attached to a surface of the substrate.

8. The camera module of claim 7, wherein the fixed frame is provided with one or more accommodating parts in which the ball bearings are accommodated.

9. The camera module of claim 8, wherein the accommodating parts have groove shapes or hole shapes.

10. The camera module of claim 8, wherein the accommodating parts are formed to be larger than the ball bearings.

11. The camera module of claim 8, wherein support pads are disposed in the accommodating parts, and the ball bearings contact the support pads.

12. The camera module of claim 8, wherein the ball bearings are disposed to partially protrude outwardly of the accommodating parts.

13. The camera module of claim 1, further comprising an auto-focusing driving part configured to drive the lens module in the optical axis direction.

14. The camera module of claim 13, wherein the auto-focusing driving part includes a first coil provided on a surface of the lens module and a first magnet disposed to face the first coil in the direction perpendicular to the optical axis direction.

15. The camera module of claim 13, wherein the auto-focusing driving part includes a first magnet attached onto one surface of the lens module and a first coil disposed to face the first magnet in the direction perpendicular to the optical axis direction.

16. The camera module of claim 1, further comprising: a hand-shake correcting part configured to drive the driving part in the direction perpendicular to the optical axis direction.

17. The camera module of claim 16, wherein the hand-shake correcting part includes a second magnet provided in one of the driving part and the fixed part and a second coil disposed to face the second magnet in the optical axis direction.

18. The camera module of claim 17, wherein the second magnet includes at least two magnets and the second coil includes at least two second coils.

19. The camera module of claim 18, wherein the magnets included in the second magnet are disposed to be orthogonal with respect to a magnet adjacent thereto on a plane perpendicular to the optical axis direction.

20. A portable electronic device comprising:
   the camera module of claim 1; and
   a body part to which the camera module is coupled.

21. A camera module comprising:
   a driving part accommodating a lens module therein;
   an elastic member attached to the driving part;
   a fixed part disposed to be spaced apart from the driving part so as to allow the driving part to be relatively movable in a direction perpendicular to an optical axis direction;
   a plurality of suspension wires, each having one end fixed to the fixed part and another end fixed to the elastic member and maintaining a gap between the driving part and the fixed part; and
   a plurality of ball bearings disposed between the driving part and the fixed part, and
   wherein when the driving part is moved in the direction perpendicular to the optical axis direction, pressure is exerted on the driving part toward the fixed part, and
   wherein portions of the elastic member, to which the another ends of suspension wires are fixed, are configured to be elastically deformed in the optical axis direction when the driving part is moved in the direction perpendicular to the optical axis direction.

22. The camera module of claim 21, wherein when the driving part is driven, the pressure is exerted on the driving part toward the fixed part in a state in which the gap between the driving part and the fixed part is maintained.

23. The camera module of claim 21, wherein the ball bearings are rollable between the driving part and the fixed part while pressure is exerted on the ball bearings by the driving part.

24. The camera module of claim 21, wherein the suspension wires are rotatably fixed to the fixed part and the elastic member.

25. The camera module of claim 24, wherein pressure directed toward the fixed part is transferred to the elastic member by the rotation of the plurality of suspension wires.

26. The camera module of claim 21, wherein the gap between the driving part and the fixed part in the optical axis direction is maintained by the suspension wires and the ball bearings.

27. The camera module of claim 21, further comprising an auto-focusing driving part driving the lens module in the optical axis direction,
wherein the auto-focusing driving part includes a first coil provided on the lens module and a first magnet disposed to face the first coil in the direction perpendicular to the optical axis direction.

28. The camera module of claim 21, further comprising a hand-shake correcting part driving the driving part in the direction perpendicular to the optical axis direction,
wherein the hand-shake correcting part includes a second magnet provided in one of the driving part and the fixed part and a second coil disposed to face the second magnet in the optical axis direction.

29. A camera module, comprising:
a driving part comprising a lens module;
a fixed part disposed to be spaced apart from the driving part in a first direction;
one or more suspension wires rotatable coupled to the driving part and the fixed part,
wherein the driving part comprises an elastic member to which the suspension wires are coupled; and
a plurality of ball bearings disposed between the driving part and the fixed part,
wherein the driving part is movable with respect to the fixed part in a second direction, and
wherein portions of the elastic member, to which the suspension wires are coupled, are configured to be deformable in the first direction when the driving part is moved in the second direction.

30. The camera module of claim 29, wherein the second direction is perpendicular to the first direction.

31. The camera module of claim 30, wherein the first direction is an optical axis direction.

32. The camera module of claim 29, wherein the ball bearings are rollable between the driving part and the fixed part.

33. The camera module of claim 29, further comprising an auto-focusing driving part configured to drive the lens module in the first direction.

34. The camera module of claim 29, further comprising a hand-shake correcting part configured to drive the driving part in the second direction.

* * * * *